United States Patent
Kim et al.

(10) Patent No.: US 11,620,335 B2
(45) Date of Patent: Apr. 4, 2023

(54) METHOD FOR GENERATING VIDEO SYNOPSIS THROUGH SCENE UNDERSTANDING AND SYSTEM THEREFOR

(71) Applicant: KOREA INSTITUTE OF SCIENCE AND TECHNOLOGY, Seoul (KR)

(72) Inventors: Ig Jae Kim, Seoul (KR); Heeseung Choi, Seoul (KR); Haksub Kim, Seoul (KR); Yoonsik Yang, Seoul (KR); Seungho Chae, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 338 days.

(21) Appl. No.: 16/995,835

(22) Filed: Aug. 18, 2020

(65) Prior Publication Data
US 2021/0081676 A1 Mar. 18, 2021

(30) Foreign Application Priority Data

Sep. 17, 2019 (KR) ........................ 10-2019-0114149

(51) Int. Cl.
| | | |
|---|---|---|
| G06F 16/738 | (2019.01) | |
| G06V 20/40 | (2022.01) | |
| G06V 10/25 | (2022.01) | |
| G06F 18/24 | (2023.01) | |
| G06V 10/764 | (2022.01) | |
| G06V 10/82 | (2022.01) | |
| G06V 10/44 | (2022.01) | |

(52) U.S. Cl.
CPC ............ *G06F 16/739* (2019.01); *G06F 18/24* (2023.01); *G06V 10/25* (2022.01); *G06V 10/454* (2022.01); *G06V 10/764* (2022.01); *G06V 10/82* (2022.01); *G06V 20/47* (2022.01)

(58) Field of Classification Search
CPC ........ G06V 20/47; G06V 10/25; G06V 10/40; G06V 10/454; G06V 10/764; G06V 10/82; G06F 16/739; G06K 9/6267; H04N 21/8549; G06T 7/20
USPC ......................................................... 382/190
See application file for complete search history.

(56) References Cited

U.S. PATENT DOCUMENTS

| | | | |
|---|---|---|---|
| 10,701,463 B2 | 6/2020 | Jeong et al. | |
| 2008/0118108 A1* | 5/2008 | Sharon | G06F 16/7837 382/103 |
| 2015/0206034 A1 | 7/2015 | Park et al. | |
| 2020/0145590 A1* | 5/2020 | Elboher | G06V 20/54 |

FOREIGN PATENT DOCUMENTS

| | | |
|---|---|---|
| KR | 1020080082963 A | 9/2008 |
| KR | 1020090117771 A | 11/2009 |
| KR | 1020150087034 A | 7/2015 |
| KR | 101805018 B1 | 12/2017 |
| KR | 1020190119229 A | 10/2019 |
| KR | 1020190121549 A | 10/2019 |
| WO | 2007057893 A2 | 5/2007 |
| WO | 2008093321 A1 | 8/2008 |

* cited by examiner

*Primary Examiner* — Amandeep Saini
(74) *Attorney, Agent, or Firm* — Cantor Colburn LLP

(57) ABSTRACT

Embodiments relate to a method for generating a video synopsis including receiving a user query; performing an object based analysis of a source video; and generating a synopsis video in response to a video synopsis generation request from a user, and a system therefor. The video synopsis generated by the embodiments reflects the user's desired interaction.

32 Claims, 8 Drawing Sheets

METHOD FOR GENERATING VIDEO SYNOPSIS THROUGH SCENE UNDERSTANDING AND SYSTEM THEREFOR

CROSS-REFERENCE TO RELATED APPLICATION

This application claims priority to Korean Patent Application No. 10-2019-0114149, filed on Sep. 17, 2019, and all the benefits accruing therefrom under 35 U.S.C. § 119, the contents of which in its entirety are herein incorporated by reference.

BACKGROUND

1. Field

Embodiments of the present disclosure relate to video synopsis generation, and more particularly, to a method for generating a user's desired video synopsis based on understanding of a scene by determining interaction in the scene and a system therefor.

[Description about National Research and Development Support]

This study was supported by the National Research Foundation of Korea (Project Name. Development core technologies for complex recognition to optimally analyze and infer identify according to dynamic changes in space-time/view, Project No. 1711094167) under the superintendence of Ministry of Science, ICT and Future Planning, Republic of Korea.

2. Description of the Related Art

Imaging devices such as closed-circuit television (CCTV) cameras, black boxes, etc., are widely used in modern daily life. Videos captured by the imaging devices are usefully used in a wide range of applications, especially in security applications such as surveillance and criminal investigation. For example, to efficiently find the movement paths of suspects or missing people, videos captured by multiple imaging devices are used. However, in the case of long-time videos, monitoring the videos to the end is inconvenient.

To overcome the inconvenience, Korean Patent Publication No. 10-2008-0082963 discloses a method that extracts moving objects included in a video to generate a synopsis video for the moving objects. The synopsis video makes it possible to see the moving objects in brief within a short time without seeing the full video.

However, the above related art generates a video synopsis based on activities of the objects (for example, velocity, speed, direction of the objects) included in the video. Thus, there is a high possibility that a video synopsis including many objects unnecessary to a user will be generated, and generating a customized video synopsis is a challenge.

On the other hand, there is an attempt to generate a video synopsis based on not only the activities of the objects included in the video but also appearance (for example, color, size, etc.) of the objects (Korean Patent Publication No. 10-2009-0117771). As this is further based on features of specific objects for which a user desires to search, the generated video synopsis has reduced objects unnecessary to the user.

However, a limitation of this attempt is generation of a video synopsis using only the features of the objects such as activities and appearance.

SUMMARY

According to an aspect of the present disclosure, there is provided a system for generating a video synopsis more suitable for a user's need based on understanding of a scene in a video including a specific object by determining interaction between the specific object and the background or interaction between the specific object and other object.

There is further provided a method for generating a video synopsis using the scene understanding information and a computer-readable recording medium having the method recorded thereon.

A system for generating a video synopsis according to an aspect of the present disclosure may include a source object detection unit configured to detect at least one source object in a source video including at least one object, a motion detection unit configured to detect a motion of the source object in the source video, a tube generation unit configured to generate a source object tube including the source object on which the motion is detected, a scene understanding unit configured to determine interaction associated with the source object of the tube, and a video synopsis generation unit configured to generate a video synopsis based on the source object tube associated with the determined interaction.

In an embodiment, the source object detection unit may detect the source object through an object detection model, and the object detection model may be pre-learned to extract a feature for detecting an object from an input image and determine a class corresponding to the object included in the input image.

In an embodiment, the object detection model may be configured to set a proposed region where the object is located in the input image, and determine the class of the object in the region by extracting the feature from the set image.

In an embodiment, the object detection model may be configured to detect the source object by extracting the feature for detecting the object from the input image and determining the class to which each pixel belongs.

In an embodiment, the object detection model may include a first submodel to determine a region of interest (ROI) by detecting a position of the object in the input image, and a second submodel to mask the object included in the ROI.

In an embodiment, the source object detection unit may be further configured to extract a background from the source video.

In an embodiment, the source object detection unit may be configured to extract the background through a background detection model that determines at least one class regarded as the background for each pixel.

In an embodiment, the source object detection unit may extract the background by cutting a region occupied by the source object in the source video.

In an embodiment, the system may further include a background database (DB) to store the extracted background of the source video.

In an embodiment, the motion detection unit may be configured to compute tracking information of the source object by tracking a specific object in a subset of frames in which the specific source object is detected.

In an embodiment, tracking information of the source object may include at least one of whether moving or not, a velocity, a speed, and a direction.

In an embodiment, the tube generation unit may be configured to generate the source object tube based on a subset of frames representing an activity of the source object, or a combination of the subset of frames representing the activity of the source object and a subset of frames representing the source object.

In an embodiment, the tube generation unit may be further configured to filter a region including the source object in the frame of the source video, and generate the source object tube in which at least part of background of the source video is removed.

In an embodiment, when a image region including the source object is extracted as a result of the detection of the source object, the tube generation unit may be further configured to generate the source object tube using the extracted image region instead of the filtering.

In an embodiment, the scene understanding unit may be configured to determine the interaction associated with the source object of the tube through an interaction determination model pre-learned to determine interaction associated with an object included in an input image. Here, the interaction determination model includes a convolution network.

In an embodiment, the interaction determination model is learned to preset an associable interaction class with the object as a subject of an action that triggers the interaction.

In an embodiment, the interaction determination model may be further configured to receive image having a size including a first object as the input image, extract a first feature, receive image having a size including a region including the first object and a different region as the input image, extract a second feature, and determine interaction associated with the first object based on the first feature and the second feature.

In an embodiment, the different region may be a region including a second object that is different from the first object, or a background.

In an embodiment, the first feature may be a feature extracted to detect the source object.

In an embodiment, the interaction determination model may be configured to determine a class of the interaction by detecting an activity of a specific object which is a subject of an action triggering the interaction and detecting a different element associated with the interaction.

In an embodiment, the interaction determination model may include an activity detection network to detect the activity of the specific object in the input image, and an object detection network to detect an object that is different from the activity object by extracting a feature from the input image. Additionally, the activity detection network may be configured to extract the feature for determining a class of the activity appearing in the video, and the object detection network may be configured to extract the feature for determining a class of the object appearing in the video.

In an embodiment, the feature for determining the class of the activity may include a pose feature, and the feature for determining the class of the object may include an appearance feature.

In an embodiment, the interaction determination model may be further configured to link a set of values computed by the activity detection network and a set of values computed by the object detection network to generate an interaction matrix, and determine the interaction associated with the specific object in the input image based on the activity and the object corresponding to a row and a column of an element having a highest value among elements of the interaction matrix.

In an embodiment, the tube generation unit may be further configured to label the source object tube with at least one of source object related information or source video related information as a result of the detection of the source object, and interaction determined to be associated with the source object of the tube.

In an embodiment, the system may further include a source DB to store at least one of the source object tube and the labeled data.

In an embodiment, the video synopsis generation unit may be configured to generate the video synopsis in response to a user query including a synopsis object and a synopsis interaction to be required for synopsis.

In an embodiment, the video synopsis generation unit may be further configured to determine the source object corresponding to the synopsis object in the detected source object, and select the source object for generating the video synopsis by filtering the source object associated with the interaction corresponding to the synopsis interaction in the selected source object.

In an embodiment, the video synopsis generation unit may be further configured to determine a start time of selected synopsis object tubes with minimized collision between the selected synopsis object tubes.

In an embodiment, the video synopsis generation unit may be further configured to group tubes having a same synopsis interaction to generate a group for each interaction when the user query includes multiple synopsis interactions, and determine a start time of each group for arrangement with minimized collision between each group.

In an embodiment, the video synopsis generation unit may be further configured to determine the start time of the selected synopsis object tubes in a same group based on a shoot time in the source video.

In an embodiment, the video synopsis generation unit may be configured to generate a synopsis video based on arranged synopsis object tubes and a background.

In an embodiment, the video synopsis generation unit may be further configured to stitch the source object tubes in which at least part of the background of the source video is removed with the background of the source video.

A method for generating a video synopsis using a tube of a source object detected in a source video and interaction, performed by a computing device including a processor, according to another aspect of the present disclosure may include receiving a user query including a synopsis object and a synopsis interaction to be required for synopsis, acquiring a source object and an interaction corresponding to the user query, selecting the source object associated with the interaction corresponding to the user query as a tube for synopsis, arranging the selected tubes, and generating a video synopsis based on the selected tubes and a background.

In an embodiment, the source object is detected in the source video through an object detection model, and the object detection model is pre-learned to extract a feature for detecting an object in an input image and determine a class corresponding to the object included in the input image.

In an embodiment, the background includes a background of the source video extracted by detecting the object in the source video.

In an embodiment, the tube of the source object may be generated based on a subset of frames representing an activity of the source object, or a combination of the subset of frames representing the activity and a subset of frames representing the source object.

In an embodiment, the frame representing the activity may be determined based on tracking information including at least one of whether moving or not, a velocity, a speed, and a direction.

In an embodiment, the tube of the source object may be generated by filtering a region including the source object in the frame of the source video.

In an embodiment, when a image region including the source object is extracted as a result of the detection of the source object, the tube of the source object may be generated using the extracted image region instead of the filtering.

In an embodiment, the interaction associated with the source object of the tube may be determined through an interaction determination model pre-learned to determine interaction associated with an object included in an input image.

In an embodiment, the interaction determination model may be configured to receive image having a size including a first object as the input image, extract a first feature, receive image having a size including a region including the first object and a different region as the input image, extract a second feature, and determine interaction associated with the first object based on the first feature and the second feature.

In an embodiment, the interaction determination model may include an activity detection network to detect an activity of the specific object in the input image, and an object detection network to detect an object that is different from the activity object by extracting a feature from the input image, the activity detection network may be configured to extract the feature for determining a class of the activity appearing in the video, and the object detection network may be configured to extract the feature for determining a class of the object appearing in the video.

In an embodiment, selecting the source object associated with the interaction corresponding to the user query may include determining the source object corresponding to the synopsis object in the detected source object, and selecting the source object for generating the video synopsis by filtering the source object associated with the interaction corresponding to the synopsis interaction in the selected source object.

In an embodiment, arranging the selected tubes may include determining a start time of the selected synopsis object tubes with minimized collision between the selected synopsis object tubes.

In an embodiment, arranging the selected tubes may include grouping tubes having a same synopsis interaction to generate a group for each interaction when the user query includes multiple synopsis interactions, and determining a start time of each group for arrangement with minimized collision between each group.

A computer-readable recording medium according to still another aspect of the present disclosure may have stored thereon computer-readable program instructions that run on a computer. Here, when the program instructions are executed by a processor of the computer, the processor performs the method for generating a video synopsis according to the embodiments.

The video synopsis system according to an aspect of the present disclosure may generate a video synopsis reflecting interaction by selecting tubes for video synopsis based on a source object detected in a source video, motion of the source object and interaction associated with the source object.

As above, the video synopsis is generated based on not only low-level video analysis involving analyzing the presence or absence of an object in a video and the appearance of the object, but also high-level video analysis involving analyzing interaction between a target object and other object (for example, a different object or a background) located outside of the target object.

Accordingly, the video synopsis system may generate a better customized video synopsis with minimized unnecessary information other than the target object that the user wants to see.

As a result, the video synopsis system maximizes the user convenience without departing from the user's need, and minimizes the capacity of the video synopsis.

The effects of the present disclosure are not limited to the above-mentioned effects, and other effects not mentioned herein will be clearly understood by those skilled in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show some modified elements such as exaggerated and omitted elements.

DETAILED DESCRIPTION

The terminology used herein is for the purpose of describing particular embodiments and not intended to be limiting of the present disclosure. Unless the context clearly indicates otherwise, the singular forms as used herein include the plural forms as well. The term "comprises" or "includes" when used in this specification, specifies the presence of stated features, regions, integers, steps, operations, elements, and/or components, but does not preclude the presence or addition of one or more other features, regions, integers, steps, operations, elements and/or components.

Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

A system and method for generating a video synopsis according to embodiments of the present disclosure may understand a scene by analysis of interaction between a first object and a background in a source video or interaction between the first object and a second object that is different from the first object, and generate a video synopsis based on the scene understanding. Accordingly, in response to receiving a video synopsis generation request from a user, it is possible to generate a video synopsis taking the user's need into further consideration, compared to earlier embodiments for generating a video synopsis using features descriptive of the object itself in the source video, such as activity and appearance of the object.

In the specification, the source video includes an object (a source object) in at least some of frames, and the object is represented in the spatio-temporal domain. The concatenation of images representing the object or activity across successive frames of a video are referred to as a "tube". As the object is represented by the tube in the spatio-temporal volume, the terms "object" and "tube" are used interchangeably in the following description.

Figure 1:
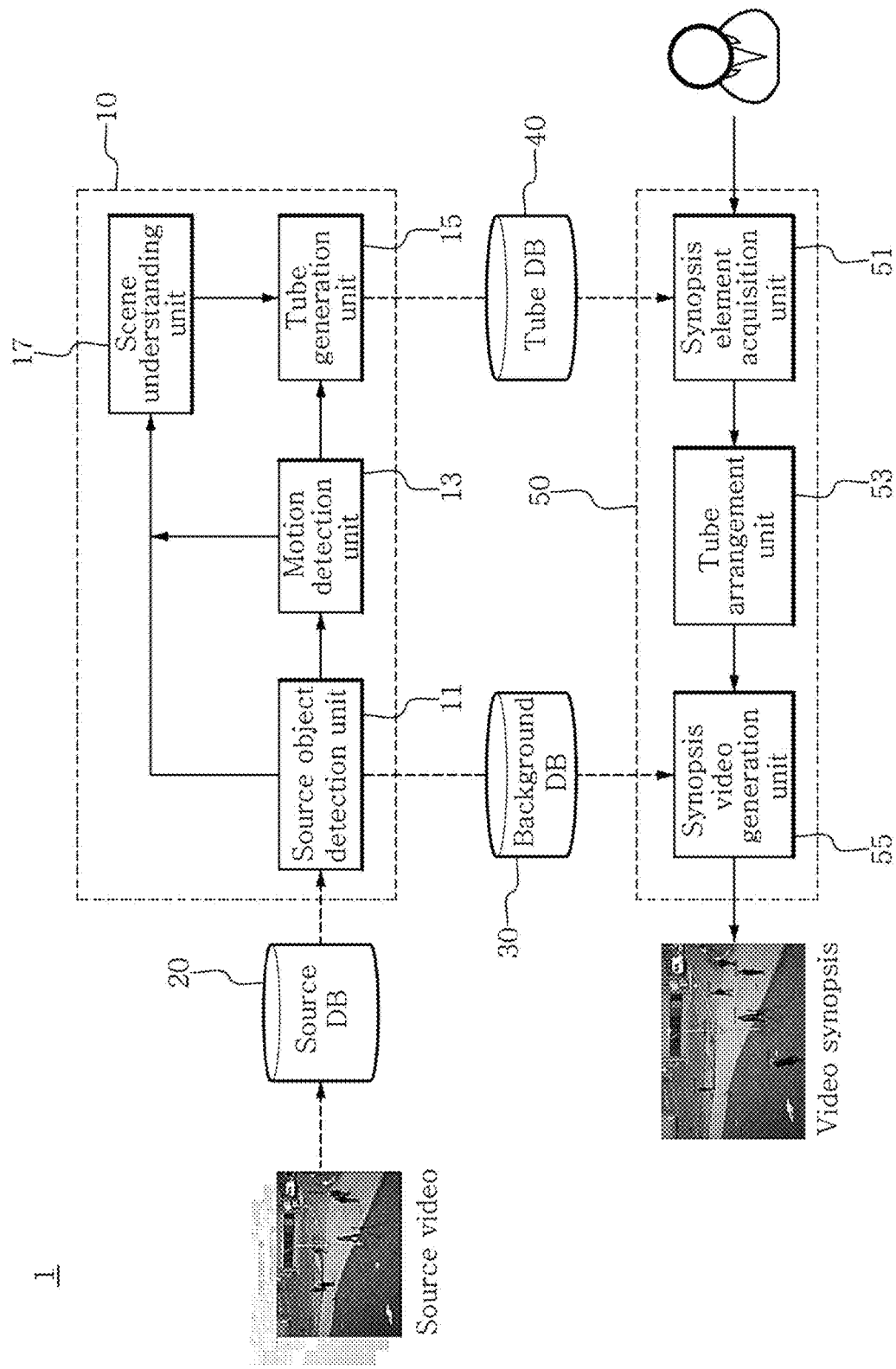
FIG. 1 is a schematic block diagram of a system for generating a video synopsis according to an embodiment of the present disclosure.

FIG. 1 is a schematic block diagram of a system for generating a video synopsis according to an embodiment of the present disclosure.

Referring to FIG. 1, the system 1 for generating a video synopsis includes a video analysis unit 10 to analyze a source video, and a video synopsis generation unit 50 to generate a synopsis video in response to a video synopsis generation request from a user. Additionally, the system 1 for generating a video synopsis may further include an imaging device (not shown) to capture the source video.

The system 1 for generating a video synopsis according to embodiments may have aspects of entirely hardware, entirely software, or partly hardware and partly software. For example, a product distribution server may refer collectively to hardware capable of processing data and software that manages the hardware. The terms "unit", "system" and "device" as used herein are intended to refer to a combination of hardware and software that runs by the corresponding hardware. For example, the hardware may be a data processing device including a Central Processing Unit (CPU), a Graphic Processing Unit (GPU) or other processor. Additionally, the software may refer to a process being executed, an object, executable, a thread of execution and a program.

Additionally, the system 1 for generating a video synopsis may include at least one database (DB). In an embodiment, the system 1 for generating a video synopsis includes a source DB 20, a background DB 30 and a tube DB 40.

Each DB 20, 30, 40 refers to a set of lots of structured, unstructured or semi-structured data, and/or hardware that stores the data. The structured data is data stored in a fixed field, and includes, for example, a relational database and a spreadsheet. Additionally, the unstructured data is data that is not stored in a fixed field, and includes, for example, text document, image, video, audio data. Additionally, the semi-structured data is data that is not stored in a fixed field, but includes metadata or schema, and the semi-structured data includes, for example, XML, HTML, and text.

The details such as information stored in each DB 20, 30, 40 are described below.

The video analysis unit 10 is configured to process the source video. In an embodiment, the video analysis unit 10 is configured to perform an object based video analysis.

The source video is a video captured by the imaging device (not shown). In an embodiment, the video may be an endless video including substantially infinite and unbounded number of objects.

The imaging device is a device that images an object to generate an image made up of a single frame and a video made up of successive frames, and includes a CCTV, a smartphone, a black box and a camera, but is not limited thereto.

In some embodiments, the imaging device may further include a component such as an infrared camera to assist in imaging. In this case, the source video includes multiple videos representing the same view and time in different styles.

In an embodiment, the source video captured by the imaging device is stored in the source DB 20. The source video may further include data of multiple frames as well as the shoot time of each frame, identification information of each frame and information of the imaging device (for example, including the model of the imaging device (for example, the manufacturer's reference number), an identifier (for example, ID), etc.).

The video analysis unit 10 acquires the source video from the imaging device or the source DB 20. The imaging device and/or the source DB 20 may be located remotely from the video analysis unit 10. In this case, the video analysis unit 10 includes a component for acquiring the source video. As an example, the video analysis unit 10 may acquire the source video (for example, by a transmitter/receiver or a wired port) via wired/wireless electrical connection.

The video analysis unit 10 is configured to perform an operation of an objectbased analysis for the source video. To this end, in an embodiment, the video analysis unit 10 may include a source object detection unit 11; a motion detection unit 13; a tube generation unit 15; and a scene understanding unit 17.

The source object detection unit 11 is configured to detect the object included in the source video. The object detection is the operation of determining where an object corresponding to a specific class is located in a given video (if any). That is, the source object may be detected by determining the class and position of the object appearing on the source video (or frame). When no class is determined, it is determined that there is no object. Meanwhile, the object may be identified by the corresponding class determined through the detection process.

In an embodiment, the source object detection unit 11 may include an object detection model pre-learned to perform the detection operation. The parameters of the object detection model are determined by machine learning to determine classes by extracting features from a specific region using multiple training samples. The source object detection unit 11 may detect the source object in the source video through the object detection model.

In an embodiment, before determining the class of the object in the video, the source object detection unit 11 may be configured to set a proposed region where the object is located in the video, and analyze the set image. The set region may be referred to as a region of interest (ROI) candidate box, and it is a sort of object localization and corresponds to an initial object detection operation.

In the above embodiment, the set candidate region is applied to the object detection model, and the class of the candidate region is determined by extracting the features from the candidate region.

The method of presetting the candidate region includes, for example, sliding window, selective search and region proposal, but is not limited thereto.

The object detection model may be, for example, a model based on the CNN algorithm, including R-CNN, Fast R-CNN, Faster R-CNN, and YOLO or You Only Look Once, but is not limited thereto.

In an embodiment, the source object detection unit 11 may detect the source object through segmentation. Here, the segmentation involves segmenting a given video at a pixel level to determine where an object corresponding to a specific class is located in the video (if any). That is, the class and position of the object may be determined by determining the class of the object for each pixel on the source video (or frame), and finally, the source object may be detected.

The source object detection unit 11 detects the source object, for example, through the segmentation technique including semantic segmentation and instance segmentation.

The semantic segmentation technique is the technique of determining the class to which each pixel belongs. Each pixel is labeled with data representing the class to which each pixel belongs, and the results of the semantic segmentation may produce a segmentation map showing the determined class of each pixel. The semantic segmentation technique does not distinguish between multiple objects determined as the same class.

The source object is detected through the instance segmentation technique. It is performed in a similar way to the semantic segmentation technique. However, as opposed to the semantic segmentation technique, the instance segmentation technique distinguishes between multiple objects determined as the same class. That is, when the instance segmentation technique is used, segmentation is performed while performing object recognition.

The object detection model that detects the source object through segmentation may be, for example, a model based on the CNN algorithm, including Fully Convolutional Network (FCN), DeepLab, U-Net and ReSeg, but is not limited thereto.

In some embodiments, the source object detection unit 11 may perform object detection and segmentation at the same time. To this end, the source object detection unit 11 includes the object detection model pre-learned to perform object detection and segmentation at the same time.

As an example, the object detection model is configured to determine a ROI through a submodel (for example, Faster R-CNN) that acts as the existing object detector, and perform instance segmentation through a submodel (for example, FCN) that masks an object included in each ROI (i.e., mask segmentation). Here, the masking refers to setting a region where an object is located in a video, and includes less non-object regions than the above-described ROI candidate video.

The object detection model that performs object detection and segmentation at the same time may be, for example, a model based on the Mask R-CNN algorithm, but is not limited thereto.

The classes for object detection rely on a training set including multiple training samples each having multiple videos. When machine learning is completed through the training samples, the object detection model has classes corresponding to the training samples as the classes for object detection. Additionally, classes may be added by re-training through the multiple training videos.

The training set includes, for example, Pascal VOC dataset including 20 classes, or CoCO dataset including 80 classes, but is not limited thereto.

As above, the source object detection unit 11 may detect the source object, and acquire information of the source object (source object information). The source object information includes, for example, the position of the object, the boundary between the object and the background and the class of the object. The position of the object is information about where the source object is located in the source frame. The boundary is a boundary between the region occupied by the source object in the source frame and the remaining region, and the region does not refer to the shape of the actual source object, and is determined based on information acquired in the object detection process. For example, when the source object is detected through the ROI candidate box, the ROI candidate box may be determined as the boundary between the object and the background. As another example, when the source object is detected through segmentation, the boundary between the object and the background may be determined according to the segmentation region.

Additionally, the source object detection unit 11 may extract the background from the source video.

In an embodiment, the source object detection unit 11 may extract the background from the source video through a variety of background subtraction algorithms. The background subtraction algorithm may include, for example, Mixture of Gaussian (MoG), improved Mixture of Gaussian (MoG), ViBe and Graph-cut, but is not limited thereto.

For example, the source object detection unit 11 may extract the background by applying the improved Mixture of Gaussian (MoG) using the Gaussian mixture model (GMM) to the source video. The source object detection unit 11 samples background frames for a predetermined period of time through the improved MoG using GMM to generate a background model, and computes changes in images of frames each time. The source object detection unit 11 may extract the background by detecting changes in the full video caused by changes in lighting component based on the video for the predetermined period of time, thereby reducing background extraction errors caused by changes in lighting. As a result, it is possible to perform a high quality background extraction function with reduced background extraction errors caused by changes in lighting due to a high extraction rate.

In other embodiment, the source object detection unit 11 may extract the background by detecting the background through segmentation.

For example, the source object detection unit 11 may extract the background through a background detection model that determines at least one class regarded as the background for each pixel. The class of the background detection model may include, for example, a road, a sidewalk, a wall, sky, a fence and a building, but is not limited thereto.

The background detection process through segmentation is similar to the above-described object detection process through segmentation, and its detailed description is omitted herein.

In another embodiment, the background is acquired by removing the region occupied by the source object in the source video.

When the source object detection unit 11 sets the region where the source object is located (for example, the region occupied by the source object in the frame) to detect the source object, the source object detection unit 11 may extract the background by cutting the region of the source object detection process.

For example, when the source object is detected through segmentation (such as, for example, instance segmentation), the segmentation results (for example, the masking results) are determined as the region occupied by the source object in the source video, and the corresponding region is cut.

Alternatively, when the source object is detected by setting the ROI candidate box, the ROI candidate box is determined as the region occupied by the source object in the source video, and the corresponding region is cut.

In some embodiments, the source object detection unit 11 may be further configured to additionally perform the segmentation operation after the detection operation for more accurate background extraction.

For example, the source object detection unit 11 may determine a region that is smaller than the ROI candidate box as the region occupied by the source object in the source video by segmenting the ROI candidate box. The segmentation operation is similar to the object detection operation through segmentation, and its detailed description is omitted herein. Through this cutting operation, the source object detection unit 11 acquires multiple frames except the source object region. In an embodiment, the source object detection unit 11 may acquire the background in which at least part of the excluded region is filled, based on the multiple frames except the source object region.

In some embodiments, the extracted background may be stored in the background DB 30.

The motion detection unit 13 detects the motion of the object in the video. In an embodiment, the motion detection unit 13 is configured to track the specific source object in a subset of frames in which the specific source object is detected. Accordingly, the motion detection unit 13 may compute tracking information as a result of tracking.

The subset of frames representing the source object, selected based on each object in the source video, will be used for video synopsis. The source object detected by the source object detection unit 11 may include a stationary object. This result occurs when the object detection model is configured to classify the class corresponding to the stationary object.

In general, the object in which the user gets interested in a video synopsis is a moving object. When the source video is an endless video, a useful video synopsis may be generated by generating successive sequences for the same object (for example, having the same ID) among objects detected in multiple frames.

The source object is detected in a series of frames. The motion detection unit 13 may track the detected source object by connecting the detected source object in the series of frames based on changes in time and color differences between the frames.

The tracking results are represented as a sequence of the corresponding frames including the source object. When the trajectory of the tracking results (for example, location, direction, etc.) is analyzed, the source object's activity is generated. The activity of the source object in each frame is eventually represented in the sequence of the corresponding frames including the source object mask. Here, the source object mask is preset (for example, by the source object detection unit 11) in the segmentation or candidate region setting process.

The motion detection unit 13 computes the tracking information of the source object based on the series of frames. As an example, when a color difference between locations of at least part of the source object mask in each frame is greater than a preset value, the source object is classified as a moving object, and the tracking information is computed based on changes in time and color difference between the frames.

However, the present disclosure is not limited thereto, and a variety of algorithms suitable for detecting the motion of the object in the video may be used. For example, an algorithm for tracking the object in the video may be used.

In some embodiments, the tracking information includes whether the object is moving or not, velocity, speed and direction, but is not limited thereto. Here, the moving object includes an object that moves in a specific frame subset in a series of frames, but does not move in a different frame subset.

The tube generation unit 15 generates a source object tube including the source object on which the motion is detected. In an embodiment, the source object tube is generated based on the source object detection results and/or the tracking information. As described above, the tube is a series of motion connected source object or object sets, and refers to the concatenation of sequences representing the object or activity across the frames of the source video.

In an embodiment, the tube generation unit 15 generates the tube of the moving source object. The tube of the moving source object is generated based on a subset of frames representing the activity or a combination of the subset of frames representing the activity and a subset of frames representing the source object. For example, when the source object stays still for a first time and moves for a second time, the tube including a subset of frames of the first time and a subset of frames of the second time may be generated.

In an embodiment, the tube may filter the region including the source object in the source frame. The video substantially required to generate a video synopsis is the video of the source object. The tube generation unit 15 may generate the tube including the video of the region occupied by the source object.

As an example, the tube generation unit 15 may generate the tube made up of only the bounding box including the source object.

As another example, the tube generation unit 15 may segment the source object and remove the background to generate the source object tube.

In some embodiments, the filtering operation may be performed based on the information acquired in the source object detection process (for example, by the source object detection unit 11).

As an example, when the source object is detected by setting an interest box region, the interest box region may be used as the bounding box. As another example, when the source object is detected through segmentation, the source object tube may be generated by using the segmentation in the detection process, and removing the background.

Alternatively, the tube generation unit 15 may filter the video of the region including the source object based on the position of the source object acquired in the source object detection process or the boundary between the object and the background.

In some embodiments, the tube generation unit 15 may perform the filtering operation using the source object detection results.

By the filtering operation, the source object tube in which at least part of the background is removed is generated.

The tube generation unit 15 is further configured to label the tube with detailed information about the tube (hereinafter, "tube information"). The tube information includes, for example, source object related information (for example, class information, position information, shoot time information, etc.), source video related information (for example, a source video identifier, total playback time, etc.), playback range information of the corresponding tube in the source video, and playback time information of the corresponding tube.

In some embodiments, the source object tube and/or the labeled tube information may be stored in the tube DB 40. The tube DB 40 provides tubes used to generate a video synopsis.

For higher level scene analysis of the source video, it is necessary to analyze the components of the scene, the object and the background, as well as a relationship between the components. In the relationship between the components, a relationship required to understand the scene is referred to as interaction.

The interaction is given when the component does an action. Here, the action refers to an action by the object, and a change in background over time is not regarded as the action. Accordingly, the interaction analyzed by the system 1 for generating a video synopsis includes interaction between the object and the background or interaction between objects. That is, the interaction is associated with at least one moving object.

The scene understanding unit 17 is configured to determine interaction associated with the source object of the tube. By determining the interaction associated with the individual object, the system 1 understands the scene representing the action of the object. A target for scene understanding includes the source video including the source object of the tube.

A typical example of the moving object is a human. As the action of the human inevitably takes place in an endless video, the human has interaction with the background or a different object (for example, an article or a different human). Hereinafter, for clarity of description, the present disclosure will be described in more detail through embodiments in which at least one of objects having interaction is a human. That is, hereinafter, it is determined that at least one of source objects having interaction corresponds to a human class. The action of the human is understood as verb.

However, the embodiments of the present disclosure are not limited thereto, and it will be obvious to those skilled in the art that interaction is also determined in embodiments in which the moving object is a moving non-human (for example, interaction between an article and the background or interaction between articles).

In an embodiment, the scene understanding unit 17 may determine the interaction associated with the source object of the tube through an interaction determination model. The interaction determination model is pre-learned to determine the interaction associated with the object included in the input image.

In an embodiment, the interaction determination model may include a variety of CNNs including Instance-Centric Attention Network (ICAN), BAR-CNN, InteractNet and HO-RCNN. The interaction determination model is machine-learned by the fully-supervised technique or semi-supervised technique.

The fully-supervised technique is the technique that recognizes the object corresponding to the original rule in the input image. The original rule presets interaction determined for each object.

The parameters of the network (or layer) of the interaction determination model that characterizes the relationship between the human and the object are learned through the fully-supervised technique. The interaction determination model learned through the fully-supervised technique may compute interaction scores between videos each representing two objects (for example, masked by the bounding box).

Figure 2:
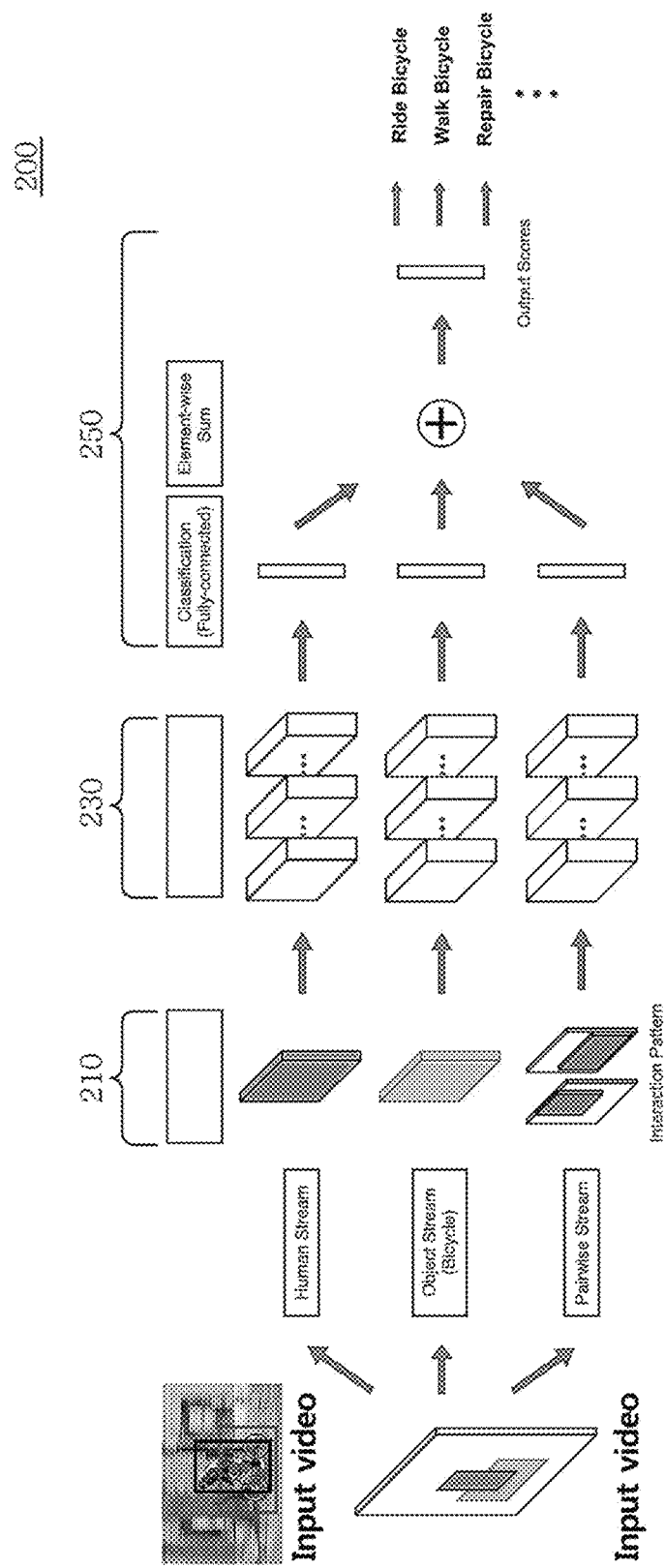
FIG. 2 is a diagram illustrating a fully-supervised interaction determination model according to an embodiment of the present disclosure.

FIG. 2 is a diagram illustrating the fully-supervised interaction determination model according to an embodiment of the present disclosure.

The interaction determination model 200 of FIG. 2 determines interaction by the fully-supervised technique, and the interaction determination model 200 includes: an input layer 210 to transmit an input image including at least one source object for scene understanding to a neural network 230; the neural network 230 including a plurality of neurons configured to receive the video from the input layer 210 and extract features for determining interaction in the corresponding video, and a determination layer 250 to determine the interaction associated with the object.

The input layer 210 of FIG. 2 receives the input image and transmits the input image to the neural network 230. In an embodiment, the input layer 210 may be configured to localize a region in which features are to be extracted. For the localization, the input layer 210 may resize the input image.

In some embodiments, the input layer 210 may be configured to crop the object in the input image, or resize the input image or the cropped video to a preset size.

The localization process of the input layer 210 is similar to the ROI candidate box setting process of the object detection model and its detailed description is omitted herein.

In some other embodiments, the localization operation of the input layer 210 is performed using the information of the source object detection process (for example, by the source object detection unit 11). The information of the detection process includes, for example, the position of the source object, and/or the boundary between the object and the background.

In some embodiments, the determination layer 250 may include a fully connected layer in which all input nodes are connected to all output nodes.

The interaction determination model 200 of FIG. 2 is a machine learning model of CNN structure having multi-stream architecture. The multi-stream includes an object stream and a pairwise stream included in the input image. The object stream refers to a flow of data processing of the video of the corresponding object through the input layer 210, the neural network 230 and the determination layer 250. The pairwise stream refers to a flow of data processing of each video (for example, a human video and an object video) including each object in pair through the input layer 210, the neural network 230 and the determination layer 250. The resized video in the object stream has a size including the corresponding object, but the resized video in the pairwise stream is configured to have a size including the two objects in pair. In the case of interaction between the background and the object, the pairwise stream is configured to have a size including both the object and the background.

For example, as shown in FIG. 2, when the full input image is a video captured at the moment when a human rides a bicycle, the stream includes a human stream, a bicycle stream and a human-bicycle pair stream. In the human stream, the localized video for feature extraction has a size including the human, but in the human-bicycle pair stream, the localized video for feature extraction has a size including the human and the bicycle.

The interaction determination model of FIG. 2 determines interaction based on the features extracted from each stream. Human related features are extracted from the human stream, bicycle related features are extracted from the bicycle stream, and interaction related features are extracted from the pair stream.

The determination layer 250 is pre-learned to generate class scores representing interaction classes to which the input image belongs based on the extracted features, and the learned determination layer may generate the class scores for interactions of the input image.

Assume that the interaction determination model of FIG. 2 is designed to determine only interaction for "biking" (i.e., determine whether it corresponds to a single class). The determination layer 250, which is the final layer of the interaction determination model, is a binary classifier that computes a score for "biking" (for example, a probability value of belonging to a class).

In an embodiment, the determination layer 250 is further configured to merge the class scores computed through the fully connected layer in each stream. Accordingly, the interaction analysis results for each stream (i.e., class scores for each stream) are merged to acquire a final score for the original input image.

In some embodiments, the determination layer 250 may acquire the final score by summing the class scores for each stream. In this case, the interaction determination model of FIG. 2 is learned to determine the corresponding class (i.e., interaction) based on the final score computed by summing.

As above, the interaction determination model of FIG. 2 is learned to preset an associable interaction with the object (for example, the human). That is, the interaction relies on the type of activity object. To this end, the interaction determination model of FIG. 2 is pre-learned using a training set including training videos representing the associable interaction.

To avoid limiting the activity object to a human, when it is learned to preset an associable interaction with a non-human object, the interaction determination model of FIG. 2 may determine interaction between non-human objects.

In an embodiment, the interaction determination model includes multiple submodels, and each submodel is learned to preset interaction by the training set for each object as the subject of the action.

On the other hand, the semi-supervised technique does not preset interaction to be determined for each object. The semi-supervised technique determines interaction by analyzing the interaction class (i.e., class scoring) for each set of a human action (verb) and a different object (for example, an article). Accordingly, interaction is not learned for each object as the subject of the action.

Figure 3:
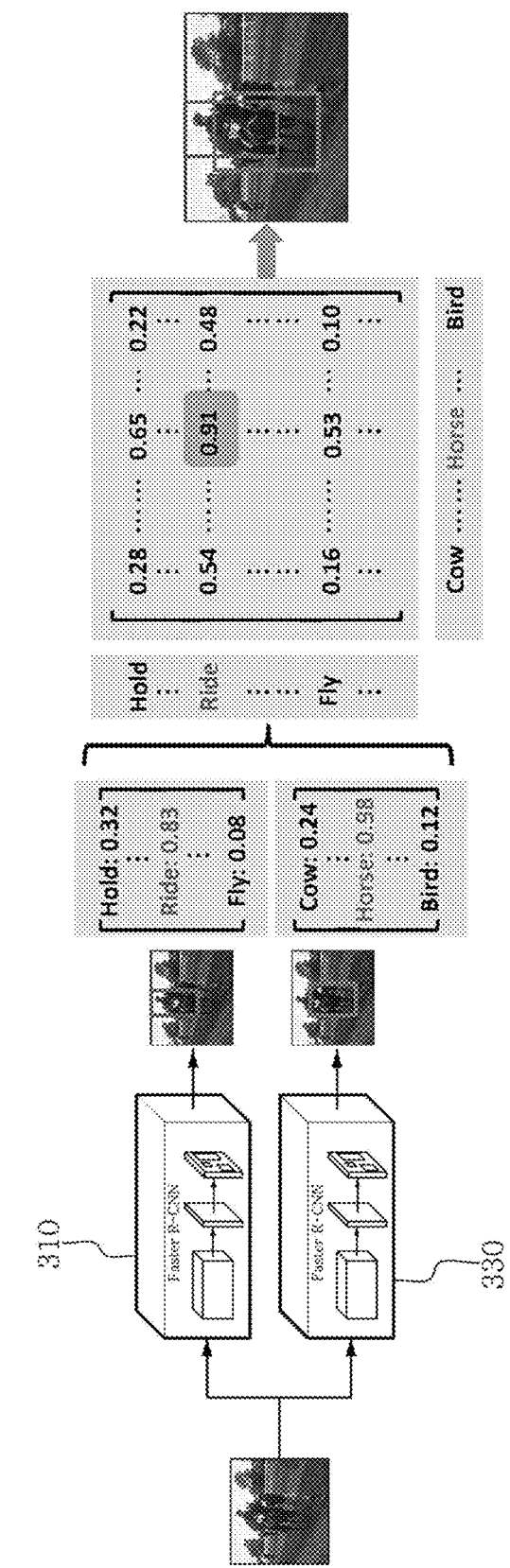
FIG. 3 is a diagram illustrating a semi-supervised interaction determination model according to an embodiment of the present disclosure.

FIG. 3 is a diagram illustrating the semi-supervised interaction determination model according to an embodiment of the present disclosure.

The interaction determination model 300 of FIG. 3 is learned to determine interaction by the semi-supervised technique. Referring to FIG. 3, the interaction determination model 300 includes: an activity detection network 310 to detect activity of a specific object in an input image; and an object detection network 330 to detect an object that is different from the activity object by extracting features in the input image.

The networks 310, 330 are independent networks since their related objects are different. The scene understanding unit 17 performs the data processing process in parallel via each network 310 or 330.

The networks 310, 330 may include a convolution network that extracts features for detecting the object in the input image. As an example, the convolution network of the activity detection network 310 may be a convolution network that extracts features by the Faster R-CNN model as shown in FIG. 3. However, the activity detection network 310 is not limited thereto, and may include a variety of convolution networks for convolved feature extraction, including a convolution layer, a ReLU layer and/or a pooling layer.

As above, each network 310, 330 has similar structures, but they are different in extracted features. Additionally, due to the difference in features, their functions are also different.

The activity detection network 310 is configured to extract the features for determining the class corresponding to the object (according to the assumption, the human) in the video as the subject of the action, and/or the features for determining the class corresponding to the activity. The interaction determination model 300 may detect the subject of the action by determining the class of the object appearing in the video, and detect the activity of the subject of the action by determining the class of the activity appearing in the video.

In an embodiment, the features for detecting the object (for example, a human) as the subject of the action include appearance features. Additionally, the features for detecting the activity include pose features.

The interaction determination model 300 computes activity features by applying the features (for example, the appearance features and the pose features) extracted by the convolution network of the activity detection network 310 to the fully connected layer of the activity detection network 310. The activity features include activity-appearance features and activity-pose features.

The activity detection by the activity detection network 310 relies on the preset class, and the class is an activity class corresponding to activity that can be done by the subject of the action. Accordingly, when the subject of the action for the activity detection network 310 is a moving article (for example, a vehicle), the vehicle is detected and the activity of the vehicle is detected.

The object detection network 330 is configured to extract features for detecting an object that is different from the subject of the action. The class of the object detection network 330 is an object class that can be represented in the video.

The features extracted by the object detection network 330 include appearance related features.

The interaction determination model 300 computes object features by applying the features (for example, appearance features) extracted by the convolution network of the object detection network 330 to the fully connected layer of the object detection network 330.

Figure 4:
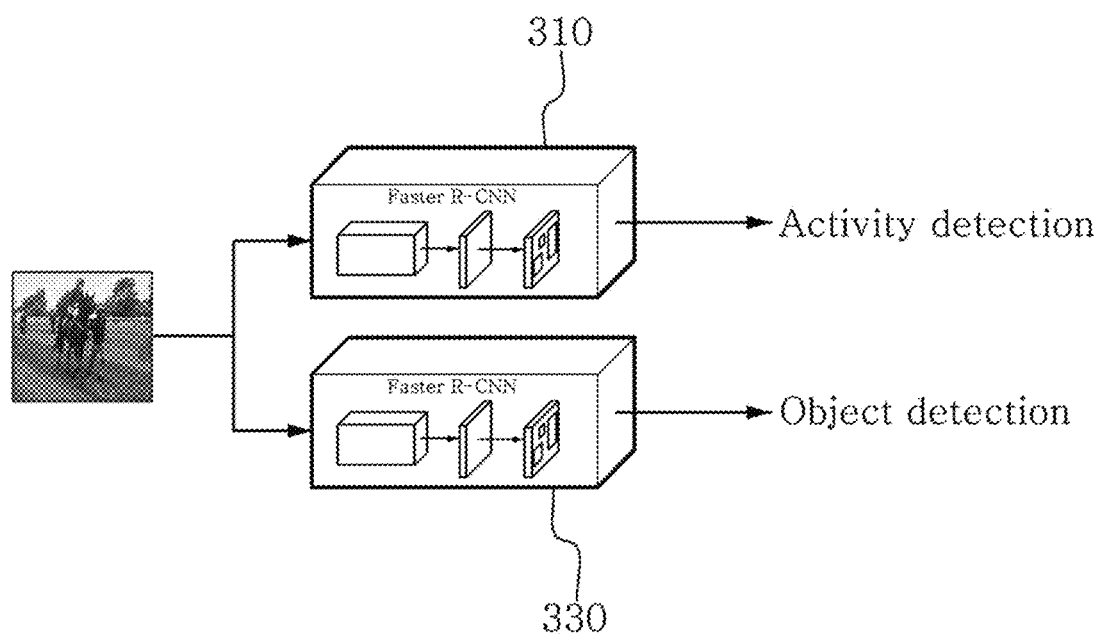
FIG. 4 is a diagram illustrating a process of training the interaction determination model of FIG. 3.

FIG. 4 is a diagram illustrating the process of training the interaction determination model of FIG. 3.

Referring to FIG. 4, training samples including multiple videos are inputted to the networks 310, 330 of FIG. 4 as the input image for learning. Each training sample is a video including the subject of the action and a different object.

The class (i.e., activity class) of the activity detection network 310 and the class (i.e., object class) of the object detection network 330 are determined by the training samples. Additionally, the parameters of the activity detection network 310 and the object detection network 330 are learned in a way that minimizes the loss function of each network 310, 330.

The loss function represents a difference between the result value from the network and the actual result value. The parameter updates are generally referred to as optimization. As an example, the parameter optimization may be performed via Adaptive Moment Estimation (ADAM), but is not limited thereto, and the parameter optimization may be performed by a variety of gradient descent techniques such as Momentum, Nesterov Accelerated Gradient (NAG), Adaptive Gradient (Adagrad) and RMSProp.

Referring back to FIG. 3, the interaction determination model 300 is further configured to determine the interaction based on the features computed by each network 310, 330.

In an embodiment, the interaction determination model 300 computes scores (for example, a probability value predicted to belong to the class) representing the prediction of belonging to the activity class and the object class from the activity features and the object features computed as the output results of each network 310, 330. The scores computed from the activity features are computed for each class, and eventually, a score set relying on the number of activity classes is computed. Additionally, the scores computed from the object features are computed for each class, and eventually, a score set relying on the number of object classes is computed.

The interaction determination model 300 links the score set for the activity and the score set for the object to generate an interaction matrix. The elements of the interaction matrix represent interaction determination scores to be determined as interactions including activities and objects corresponding to each row and each column.

In FIG. 3, the interaction matrix includes the probability value set for the activity in column and the probability value set for the object in row, but it will be obvious to those skilled in the art that the interaction matrix may be formed to the contrary.

In an embodiment, the interaction determination score may be an average of scores in each score set corresponding to each row and each column, but is not limited thereto. Other suitable techniques for computing other types of representative values may be used to determine the interaction.

Describing the interaction matrix for the input image in FIG. 3, the interaction determination score of the matrix element including "ride" as the activity class and "horse" as the object class has the highest value. Thus, the scene understanding unit 17 may determine that the input image has interaction "a human rides a horse" through the interaction determination model 300.

In an embodiment, the interaction determination model 300 may be further configured to use the information of the source object detection process (for example, by the source object detection unit 11).

In some embodiments, the interaction determination model 300 may set the region where the features will be extracted by each network 310, 330 to determine the interaction based on the source object detection results. For example, the bounding box of the interaction determination model 300 is set based on the position of the detected source object.

In some embodiments, the interaction determination model 300 may be configured not to extract the features for detecting the object as the subject of the action and a different object as a candidate expected to have interaction with the subject of the action. As an example, the activity detection network 310 may be only configured to extract the features (for example, the pose features) for detecting the activity of the specific source object as the subject of the action acquired by the source object detection results. As another example, the interaction determination model 300 is configured to use the source object detection results rather than including the object detection network 330. In this case, the object detection scores computed for source object detection are used to generate the interaction matrix.

Meanwhile, the process of determining the interaction between the object and the background and the learning process are also similar to the process of determining the interaction between objects and the learning process shown in FIGS. 3 and 4. In this case, each training sample is a video including the subject of the action and the background, and the model 300 includes a network learned to determine the class of the background. In some embodiments, the network 330 may be further learned to determine the class of the background.

As above, the scene understanding unit 17 may understand the scene representing the source object of the tube by analyzing the activity of the source object of the tube.

The interaction determined by the scene understanding unit 17 may be further labeled to the source object tube associated with the corresponding interaction. When the source object tube is stored in the tube DB 40, the interaction associated with the source object is also stored in the tube DB 40.

The system 1 for generating video synopsis receives a user query requesting video synopsis generation, and generates a video synopsis that meets the user's request based on the user query.

Referring back to FIG. 1, the system 1 includes the video synopsis generation unit 50 to generate a video synopsis based on the source object tube and the associated interaction. In an embodiment, the video synopsis generation unit 50 may generate the video synopsis in response to the user query. In some embodiments, the video synopsis generation unit 50 may include a synopsis element acquisition unit 51, a tube arrangement unit 53 and a synopsis video generation unit 55.

The system 1 acquires a video element required to generate the video synopsis based on the user query (for example, by the synopsis element acquisition unit 51). The user query includes an object (hereinafter, a "synopsis object") that will appear in the video synopsis, or an interaction (hereinafter, a "synopsis interaction") that will appear in the video synopsis. In some embodiments, the user query may further include the total playback time of the video synopsis, or a specific playback range of the source video required for the video synopsis.

The system 1 for generating a video synopsis may select the synopsis object and the synopsis interaction of the user query from the source video (for example, by the synopsis element acquisition unit 51).

In an embodiment, the synopsis element acquisition unit 51 may acquire a source object corresponding to the synopsis object from source objects stored in the tube DB 40.

For example, the synopsis element acquisition unit 51 may acquire a source object corresponding to the synopsis object by searching for the source object having a class that matches a class of the synopsis object among multiple source objects stored in the tube DB 40.

The source object corresponding to the synopsis object may be associated with multiple interactions or different interactions. To use a source object tube that accurately meets the user's request, the synopsis element acquisition unit 51 filters the source object having interaction corresponding to the synopsis interaction in the source object corresponding to the synopsis object. Thus, a synopsis object having an interaction class that matches the required class is acquired.

The system 1 for generating a video synopsis determines the source object acquired corresponding to the user query (i.e., matching the object class and the interaction class) as the synopsis object, and uses the source object tube to generate a video synopsis. That is, the source object acquired corresponding to the user query by the system 1 for generating a video synopsis is the synopsis object selected to generate a video synopsis.

The tube arrangement unit 53 arranges the synopsis object tubes selected corresponding to the user query. The arrangement is performed by determining the start time of the selected synopsis object tubes.

In an embodiment, the tube arrangement unit 53 determines the start time of the selected synopsis object tubes in a way that minimizes collision between the selected synopsis object tubes. In the process of minimizing collision, temporal consistency is maintained to the maximum. The arrangement by this rule may be referred to as optimized arrangement.

Figure 5:
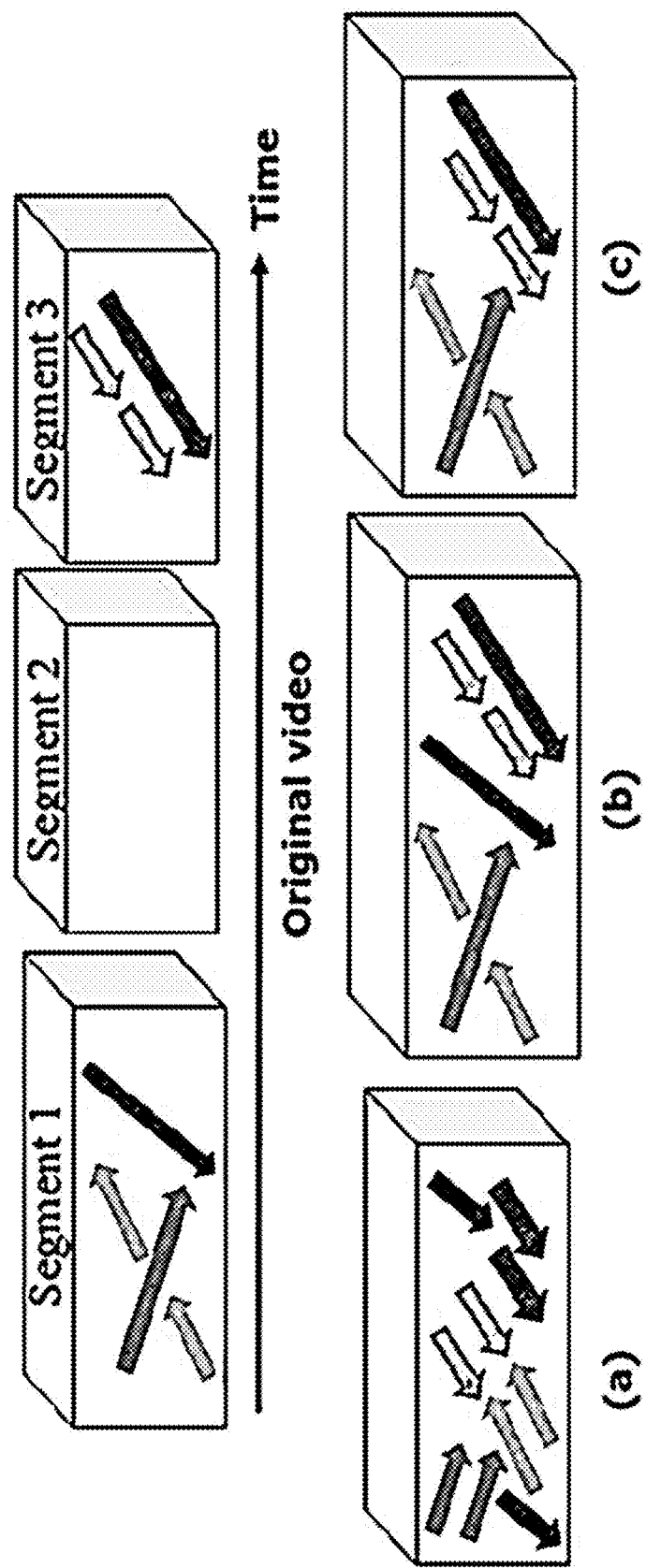
FIG. 5 is a conceptual diagram of a video synopsis generated by a system for generating a video synopsis according to an embodiment of the present disclosure.

FIG. 5 is a conceptual diagram of the video synopsis generated by the system for generating a video synopsis according to an embodiment of the present disclosure.

In an embodiment, the tube arrangement unit 53 shifts each event object tube (tube shifting) until a collision cost is less than a predetermined threshold Φ while maintaining temporal consistency. Here, the collision cost is represented by every two tubes and temporal overlaps for all relative temporal shifts between them. The predetermined threshold Φ may be different values according to circumstances. For example, when there are a small number of event objects included in a cluster, the predetermined threshold Φ may be set to a relatively small value due to the spatio-temporal redundancy in the video synopsis. Additionally, the length L of the video synopsis is minimized.

The optimization process is performed by grouping objects of interest temporally and spatially. Referring to FIG. 5, synopsis object tubes selected from a non-chronological video synopsis are arranged as shown in the results (A) of FIG. 5, and synopsis object tubes selected from a spatio-temporal group-based video synopsis are arranged as shown in the results (B) of FIG. 5. In contrast, synopsis object tubes from a video synopsis corresponding to the user query are arranged as shown in the results (C) of FIG. 5.

In an embodiment, when the user query includes multiple synopsis interactions, the tube arrangement unit 53 groups tubes having the same synopsis interaction to generate groups by interaction.

Thus, two or more groups by interaction are generated. The tube arrangement unit 53 arranges in a way that minimizes collision between each group. In the arrangement between groups, a chronological order is not considered. It is because the user's main interest is interaction.

The arrangement process with minimized collision between groups is similar to the above-described arrangement with minimized collision between tubes, and its detailed description is omitted herein.

Additionally, in arranging each interaction group, the tube arrangement unit 53 may further arrange the tubes included in the groups. In some embodiments, multiple synopsis object tubes included in a group having the same interaction may be arranged based on the shoot time in the source video. The reason is that the user's main interest is satisfied through grouping, and thus, there is no need to ignore the chronological order.

As above, it is possible to provide an efficient video synopsis to the user who pays attention to interaction, by arranging tubes having different interactions in a distinguishable way to prevent collision between groups having the same interaction.

The synopsis video generation unit 55 generates a synopsis video based on the arranged synopsis object tube sets and the background. To this end, the synopsis video generation unit 55 selects a suitable background for the selected synopsis object. In an embodiment, the suitable background is the background of the source video including the selected synopsis object.

In some embodiments, when the user query includes information related to the source video, the background of the source video is determined as the background for the synopsis video. The background of the source video may be searched from the background DB 30 (for example, by the synopsis element acquisition unit 51 or the synopsis video generation unit 55).

Additionally, when the user query includes information related to the playback range of the source video, a change in background over time during the playback range may be applied to the found background. In this case, the time-lapse background is used as the background of the synopsis video.

In some other embodiments, the background for generating a video synopsis is acquired based on the source object acquired as the synopsis object. For example, the background of the source video of the selected synopsis object tube is selected as the background of the synopsis video.

In other embodiment, the suitable background may be a user-defined background separately acquired as the background of the synopsis video.

The synopsis video generation unit 55 generates a synopsis video by combining the synopsis object tube with the selected background. The synopsis video generation unit 55 may stitch the synopsis object tube and the selected background by applying the position of the synopsis object to the selected background. The stitching operation may be performed through a variety of suitable stitching algorithms.

In some embodiments of the present disclosure, relatively accurate segmentation may be performed on the selected synopsis object, thereby minimizing a background mismatch (for example, when the source object is detected through segmentation).

The synopsis video generation unit 55 may be further configured to perform sampling. In an embodiment, when the playback time of the synopsis video is set by the user query, the synopsis video generation unit 55 may sample the synopsis video at the set playback time so that the video synopsis has the set playback time.

Each unit 10, 11, 13, 15, 17, 20, 30, 40, 50, 51, 53, 55 of the system 1 for generating a video synopsis according to embodiments is not necessarily intended to indicate physically distinguishable separate components. That is, although FIG. 1 shows distinguishable separate blocks, according to embodiments, some or all of the units may be integrated in a same device (for example, a server including a database). That is, each unit 10, 11, 13, 15, 17, 20, 30, 40, 50, 51, 53, 55) is functionally distinguished according to their operations in a computing device into which they are implemented, and each unit does not need to be provided independently of each other.

It will be obvious to those skilled in the art that the system 1 for generating a video synopsis may include other components not described herein. For example, the system 1 for generating a video synopsis may further include a data input device, an output device such as a display and a printer, a storage device such as memory, a transmitter/receiver to transmit and receive data via electrical communication, a network, a network interface and a protocol.

As shown in FIG. 2, the above-described embodiments include an online phase (for example, the video processing unit 10) in which a video is processed irrespective of a user query and a response phase in which a video synopsis is generated in response to a user query, but the embodiments of the present disclosure are not limited thereto.

In an embodiment, the system 1 for generating a video synopsis may include a single phase in which a video synopsis is generated by analysis of a source video in response to a user query. In this case, when receiving the user query, the system 1 for generating a video synopsis is configured to acquire a source video from the source DB 20 in which source videos are stored, and generate a video synopsis corresponding to the user query by analysis of the corresponding source video.

A method for generating a video synopsis according to an aspect of the present disclosure may be performed by a computing device including a processor. In an embodiment, the method for generating a video synopsis may be performed by part or all of the video synopsis system 1.

Figure 6:
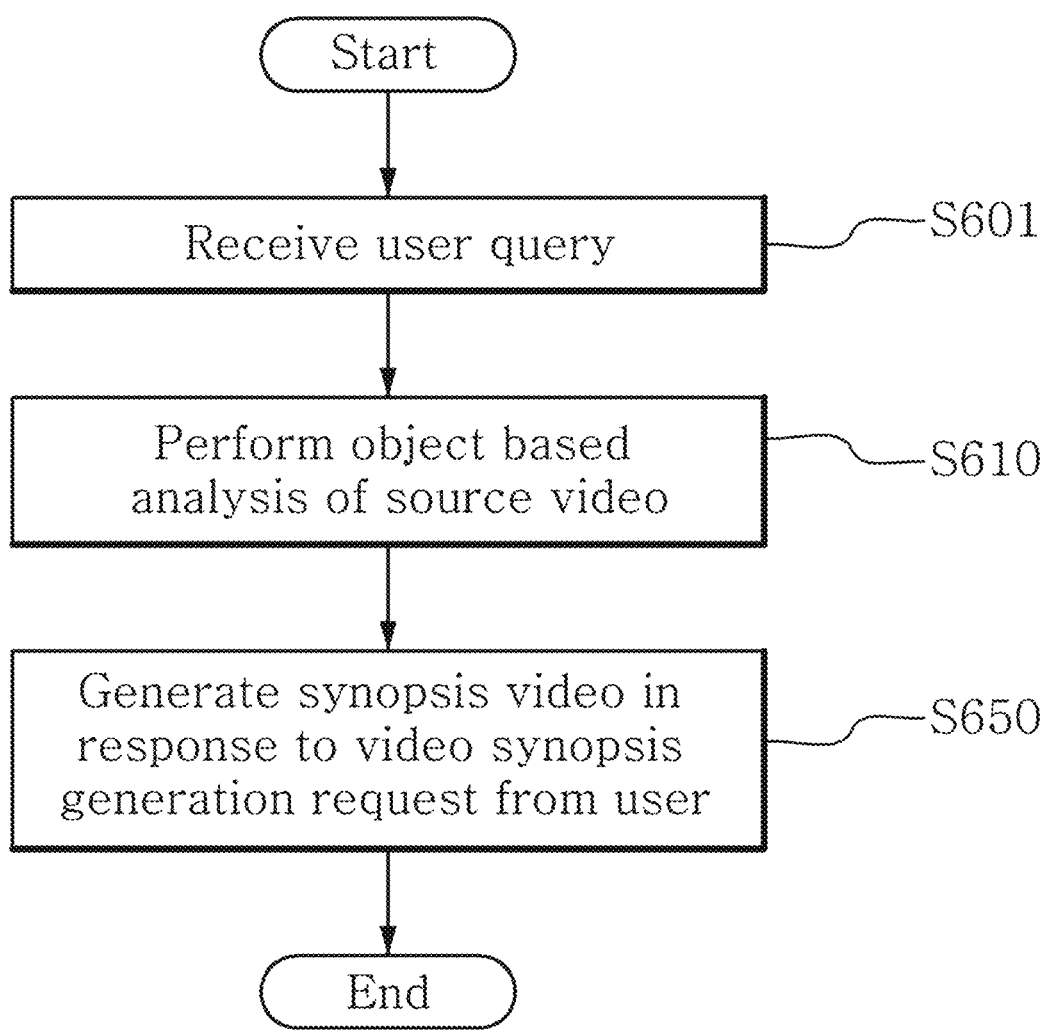
FIG. 6 is a flowchart of a method for generating a video synopsis according to an embodiment of the present disclosure.

FIG. 6 is a flowchart of the method for generating a video synopsis according to an embodiment of the present disclosure.

Referring to FIG. 6, the method for generating a video synopsis includes: receiving a user query (S601); performing an object based analysis of a source video (610); and generating a synopsis video in response to a video synopsis generation request from a user (S650).

In an embodiment, the object-based analysis for the source image (S610) may be performed before the step S601. A series of processes therefor is shown in the system of FIG. 1.

In other embodiment, the object-based analysis for the source image (S610) may be performed after the step S601. A series of processes therefor is may be obtained by modifying the system of FIG. 1. For example, the modified system of FIG. 1 for performing the above embodiment may be configured such that the synopsis element acquisition unit 51 includes the video analysis unit 10, and the analysis operation of the video analysis unit 10 is performed in response to the user query.

Figure 7:
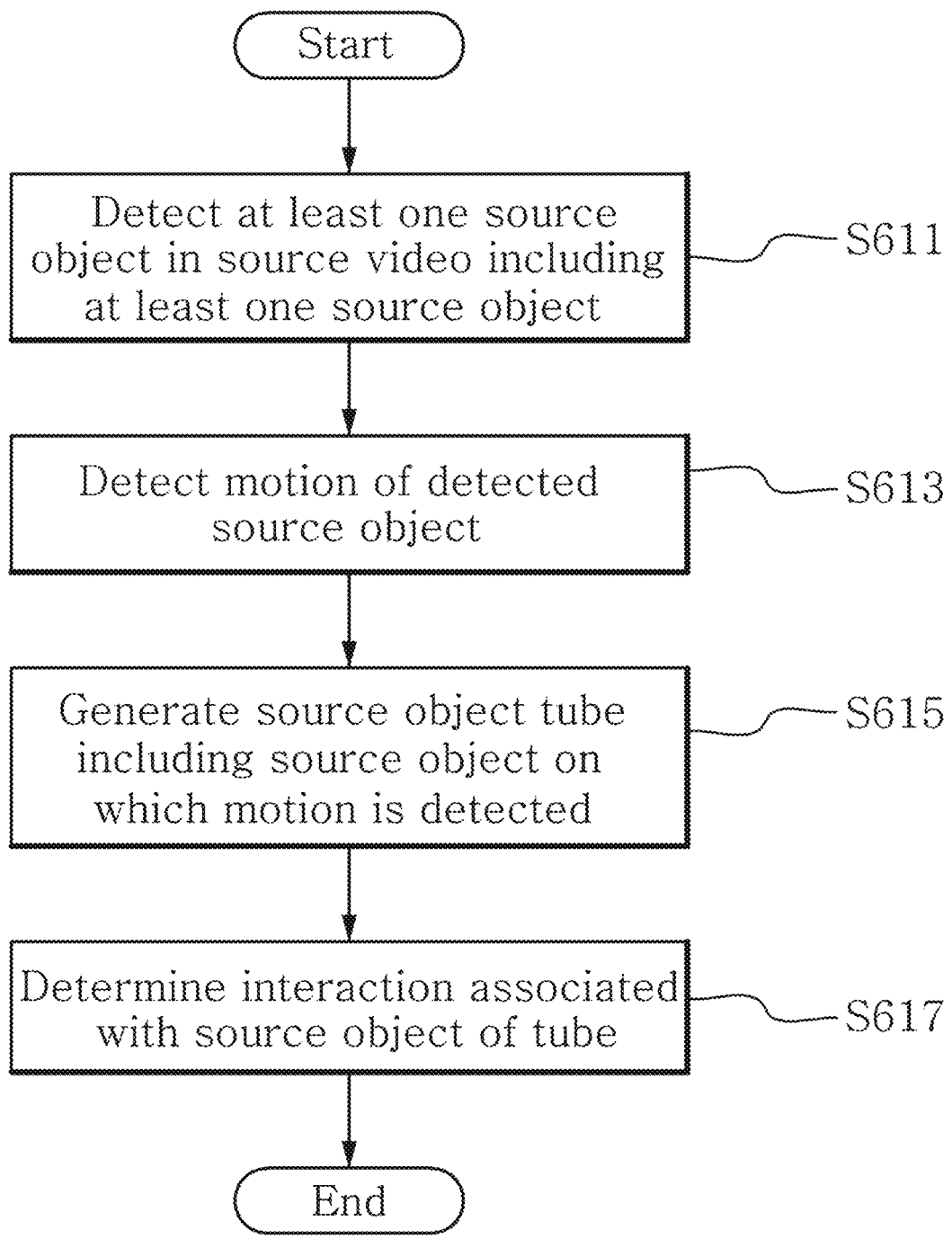
FIG. 7 is a flowchart illustrating a source video analysis process according to an embodiment of the present disclosure.

FIG. 7 is a flowchart illustrating the source video analysis process according to an embodiment of the present disclosure.

Referring to FIG. 7, the step S610 includes: detecting at least one source object in a source video including the at least one source object (S611); detecting a motion of the detected source object (S613); generating a source object tube including the source object on which the motion is detected (S615); and determining interaction associated with the source object of the tube (S617).

In an embodiment, the step S611 is performed through the object detection model in the source video. Here, the object detection model is a model that is pre-learned to determine a class corresponding to an object included in an input image by extracting features for detecting the object in the input image.

The object detection model used in the step S611 is described in detail above with reference to the source object detection unit 11, and its detailed description is omitted herein.

In an embodiment, the step S610 further includes: extracting the background from the source video (S612). In some embodiments, in the step S612, the background of the source video may be extracted by detecting the object in the source video. The extracted background of the source video may be used as a background of a synopsis video. However, the background of the synopsis video is not limited thereto.

The background extraction process for performing the step S612 is described in detail above with reference to the source object detection unit 11, and its detailed description is omitted herein.

In the step S613, activity information including at least one of whether the source object is moving or not, velocity, speed, and direction is computed from the source video.

The frame of the source video in which the tracking information is computed is a frame representing the activity, and is used as at least part of a source object tube.

In an embodiment, the source object tube is generated based on a subset of frames representing the activity of the source object, or a combination of the subset of frames representing the activity and a subset of frames representing the source object (S615).

In some embodiments, the source object tube may be a source object tube in which at least part of the background of the source video is removed by filtering a region including the source object in the frame of the source video (S615).

The tube generation process of the step S615 is described in detail above with reference to the tube generation unit 15, and its detailed description is omitted herein.

In an embodiment, interaction associated with the source object of the tube may be determined through the interaction determination model pre-learned to determine interaction associated with the object included in the input image (S617). Here, an object under consideration as to whether it is associated with interaction is the source object of the tube.

In some embodiments, the interaction determination model may be a model configured to receive image having a size including a first object as the input image, extract a first feature, receive image having a size including a region including the first object and a different region as the input image, extract a second feature, and determine interaction associated with the first object based on the first feature and the second feature. Here, the different region includes a region including a second object that is different from the first object in the source video, or the background.

In some other embodiments, the interaction determination model may include: an activity detection network to detect activity of the specific object in the input image; and an object detection network to detect an object that is different from the activity object by extracting features from the input image. Here, the activity detection network is configured to extract the features for determining the class of the activity appearing in the video, and the object detection network is configured to extract the features for determining the class of the object appearing in the video.

The interaction determination model of the step S617 is described in detail above with reference to FIGS. 2 and 3, and its detailed description is omitted herein.

In an embodiment, the source object tube may be labeled with at least one of source object related information or source video related information as a result of the detection of the source object, and interaction determined to be associated with the source object of the tube.

Figure 8:
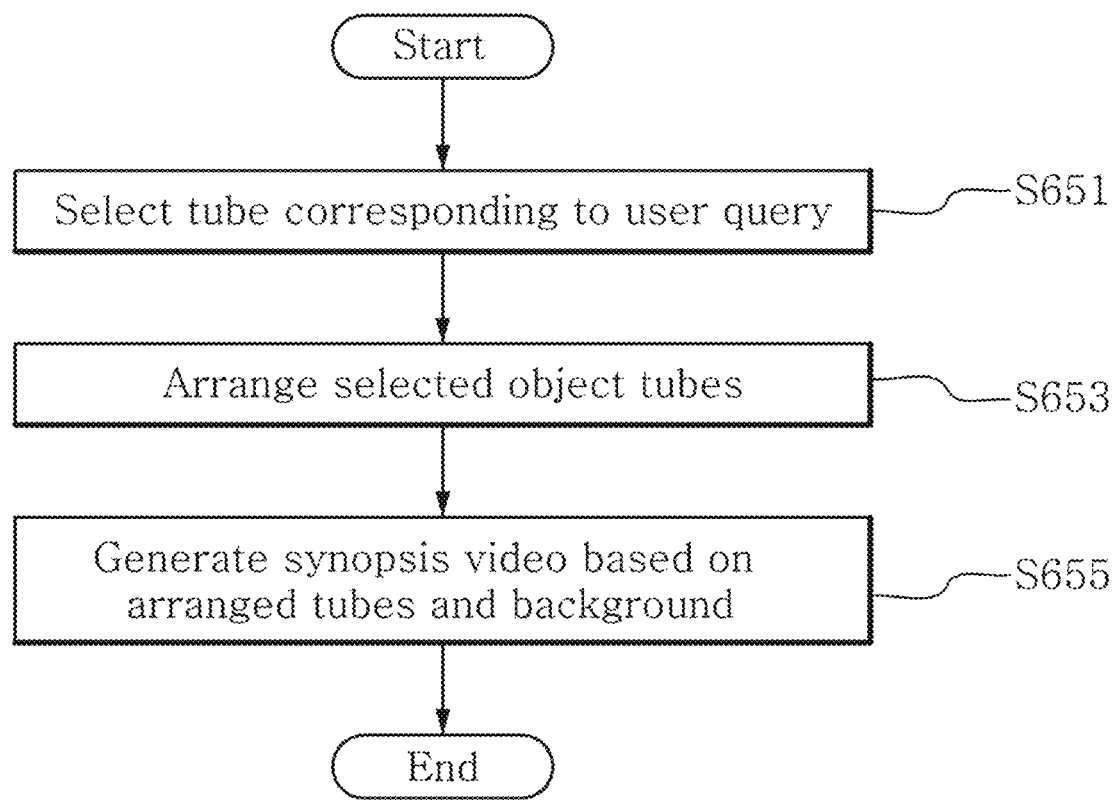
FIG. 8 is a diagram illustrating a synopsis video generation process according to an embodiment of the present disclosure.

FIG. 8 is a diagram illustrating the synopsis video generation process according to an embodiment of the present disclosure.

Referring to FIG. 8, the step S650 includes: selecting a tube corresponding to a user query (S651); arranging the selected object tubes (i.e., tubes of the source object selected as the synopsis object) (S653); and generating a synopsis video based on the arranged tubes and the background (S655).

In the step S651, the tube corresponding to the user query is a tube of the source object corresponding to the synopsis object included in the user query, associated with interaction corresponding to the synopsis interaction included in the user query.

In an embodiment, the tube corresponding to the user query is selected by: determining the source object corresponding to the synopsis object in the detected source object, and filtering the source object associated with interaction corresponding to the synopsis interaction in the selected source object (S651).

In the step S653, the tubes selected in the step S651 are arranged by determining the start time of the selected synopsis object tubes with minimized collision between the selected synopsis object tubes.

In an embodiment, the step of arranging the selected tubes may include: when the user query includes multiple synopsis interactions, grouping tubes having the same synopsis interaction to generate groups by interaction; and determining the start time of each group for arrangement with minimized collision between each group.

In some embodiments, the step of arranging the selected tubes may further include: determining the start time of the selected tubes by minimizing collision between the synopsis object tubes in the same group.

In the step S655, a synopsis video is generated based on the arranged synopsis object tubes and the background.

In an embodiment, the step S655 may include: stitching the source object tubes, in which at least part of the background of the source video is removed, with the background of the source video.

In an embodiment, the step S655 may further include: sampling the playback speed of the synopsis video.

The steps S651 to S655 are described in detail above with reference to the video synopsis generation unit 50, and its detailed description is omitted herein.

As above, the method for generating a video synopsis and the system 1 therefor may detect the source object by object-based analysis for the source image. Additionally, the motion of the source object may be detected. Additionally, tubes used as the synopsis object tubes may be selected to generate a video synopsis based on the source object, the motion, and the interaction associated with the source object.

As a result, it is possible to provide a customized video synopsis satisfying the user's need better.

The operation of the method for generating a video synopsis and the system 1 therefor according to the embodiments as described above may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage, and networking component (either wireless or wired). The computer may run an operating system (OS) such as, for example, OS that is compatible with Microsoft Windows, Apple OS X or iOS, Linux distribution, or Google Android OS.

The computer-readable recording medium includes all types of recording devices in which computer-readable data is stored. Examples of the computer-readable recording medium include read only memory (ROM), random access memory (RAM), compact disc read only memory (CD-ROM), magnetic tape, floppy disk, and optical data storage and identification devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

Recently, there are technological advances in video surveillance systems such as intelligent CCTV systems and their ever-increasing range of applications. The system for generating a video synopsis according to an aspect of the present disclosure may generate a video synopsis reflecting a specific interaction that the user desires to see, by analyzing interaction of the source video through the interaction determination model based on one of technologies of the fourth industrial revolution, machine learning, thereby providing maximum efficiency and convenience through minimal information, and it is expected to have an easy access to the corresponding market and a great ripple effect.

What is claimed is:

1. A system for generating a video synopsis, comprising:
   at least one processor; and
   a non-transitory memory storing instructions which, when executed by the at least one processor, cause the at least one processor to:
   detect at least one source object in a source video including at least one object;
   detect one or more motion of the source object in the source video;
   generate one or more source object tube including the source object on which the motion is detected;
   determine an interaction associated with the source object of the tube through an interaction determination model pre-learned to determine interactions associated with an object included in an input image, the interaction determination model comprising a convolution network; and
   generate one or more video synopsis based on the source object tube associated with the determined interaction.

2. The system for generating a video synopsis according to claim 1, wherein the instructions, when executed by the at least one processor, further cause the at least one processor to detect the source object through an object detection model, and
   the object detection model is pre-learned to extract one or more feature for detecting an object from an input image and determine a class corresponding to the object included in the input image.

3. The system for generating a video synopsis according to claim 2, wherein the object detection model is configured to detect the source object by extracting the feature for detecting the object from the input image and determining the class to which each pixel belongs.

4. The system for generating a video synopsis according to claim 3, wherein the object detection model includes:
a first submodel to determine a region of interest (ROI) by detecting a position of the object in the input image; and
a second submodel to mask the object included in the ROI.

5. The system for generating a video synopsis according to claim 1, wherein the instructions, when executed by the at least one processor, further cause the at least one processor to:
extract a background from the source video.

6. The system for generating a video synopsis according to claim 5, wherein the instructions, when executed by the at least one processor, further cause the at least one processor to:
extract the background through a background detection model that determines at least one class regarded as the background for each pixel.

7. The system for generating a video synopsis according to claim 5, wherein the instructions, when executed by the at least one processor, further cause the at least one processor to:
extract the background by cutting a region occupied by the source object in the source video.

8. The system for generating a video synopsis according to claim 5, further comprising:
a background database (DB) to store the extracted background of the source video.

9. The system for generating a video synopsis according to claim 1, wherein the instructions, when executed by the at least one processor, further cause the at least one processor to:
compute tracking information of the source object by tracking a specific object in a subset of frames in which the specific source object is detected.

10. The system for generating a video synopsis according to claim 9, wherein tracking information of the source object includes at least one of whether moving or not, a velocity, a speed, and a direction.

11. The system for generating a video synopsis according to claim 1, wherein the instructions, when executed by the at least one processor, further cause the at least one processor to:
generate the source object tube based on a subset of frames representing an activity of the source object, or a combination of the subset of frames representing the activity of the source object and a subset of frames representing the source object.

12. The system for generating a video synopsis according to claim 11, wherein the instructions, when executed by the at least one processor, further cause the at least one processor to:
filter a region including the source object in the frame of the source video, and
generate the source object tube in which at least part of background of the source video is removed.

13. The system for generating a video synopsis according to claim 1, wherein the instructions, when executed by the at least one processor, further cause the at least one processor to:
when a image region including the source object is extracted as a result of the detection of the source object, generate the source object tube using the extracted image region instead of the filtering.

14. The system for generating a video synopsis according to claim 1, wherein the interaction determination model is learned to preset an associable interaction class with the object, wherein the said object is a subject of an action that triggers the interaction.

15. The system for generating a video synopsis according to claim 14, wherein the interaction determination model is further configured to:
receive image having a size including a first object as the input image and extract a first feature,
receive image having a size including a region including the first object and a different region as the input image and extract a second feature, and
determine interaction associated with the first object based on the first feature and the second feature.

16. The system for generating a video synopsis according to claim 15, wherein the different region includes a region including a second object that is different from the first object, or a background.

17. The system for generating a video synopsis according to claim 15, wherein the first feature is a feature extracted to detect the source object.

18. The system for generating a video synopsis according to claim 1, wherein the interaction determination model is configured to determine a class of the interaction by detecting an activity of a specific object which is a subject of an action triggering the interaction and detecting a different element associated with the interaction.

19. The system for generating a video synopsis according to claim 18, wherein the interaction determination model includes:
an activity detection network to detect the activity of the specific object in the input image; and
an object detection network to detect an object that is different from the activity object by extracting a feature from the input image,
the activity detection network is configured to extract the feature for determining a class of the activity appearing in the video, and
the object detection network is configured to extract the feature for determining a class of the object appearing in the video.

20. The system for generating a video synopsis according to claim 19, wherein the feature for determining the class of the activity includes a pose feature, and
the feature for determining the class of the object includes an appearance feature.

21. The system for generating a video synopsis according to claim 19, wherein the interaction determination model is further configured to:
link a set of values computed by the activity detection network and a set of values computed by the object detection network to generate an interaction matrix, and
determine the interaction associated with the specific object in the input image based on the activity and the object corresponding to a row and a column of an element having a highest value among elements of the interaction matrix.

22. The system for generating a video synopsis according to claim 1, wherein the instructions, when executed by the at least one processor, further cause the at least one processor to:

label the source object tube with at least one of source object related information or source video related information as a result of the detection of the source object, and interaction determined to be associated with the source object of the tube.

23. The system for generating a video synopsis according to claim 22, further comprising:
a source database (DB) to store at least one of the source object tube and the labeled data.

24. The system for generating a video synopsis according to claim 1, wherein the instructions, when executed by the at least one processor, further cause the at least one processor to:
generate the video synopsis in response to a user query including a synopsis object and a synopsis interaction to be required for synopsis.

25. The system for generating a video synopsis according to claim 24, wherein the instructions, when executed by the at least one processor, further cause the at least one processor to:
determine the source object corresponding to the synopsis object in the detected source object, and
select the source object for generating the video synopsis by filtering the source object associated with the interaction corresponding to the synopsis interaction in the selected source object.

26. The system for generating a video synopsis according to claim 24, wherein the instructions, when executed by the at least one processor, further cause the at least one processor to:
select the source object associated with the interaction corresponding to the user query as a tube for synopsis, and arranging the selected tubes; and
generate the video synopsis based on the selected tubes and a background.

27. The system for generating a video synopsis according to claim 26, wherein the instructions, when executed by the at least one processor, further cause the at least one processor to:
determine a start time of selected synopsis object tubes with minimized collision between the selected synopsis object tubes.

28. The system for generating a video synopsis according to claim 26, for generating the video synopsis based on the selected tubes and a background, wherein the instructions, when executed by the at least one processor, further cause the at least one processor to:
stitch the source object tubes in which at least part of the background of the source video is removed with the background of the source video.

29. The system for generating a video synopsis according to claim 24, wherein the instructions, when executed by the at least one processor, further cause the at least one processor to: group tubes having a same synopsis interaction to generate a group for each interaction when the user query includes multiple synopsis interactions.

30. The system for generating a video synopsis according to claim 29, wherein the instructions, when executed by the at least one processor, further cause the at least one processor to:
determine start times of each group, wherein the start times minimizes collision between each group, and
arrange the plurality of groups based on each start time of each group.

31. The system for generating a video synopsis according to claim 30, for arranging the plurality of groups, wherein the instructions, when executed by the at least one processor, further cause the at least one processor to:
determine start times of the selected synopsis object tubes in a same group based on a shoot time in the source video.

32. A system for generating a video synopsis, comprising:
a source object detection unit configured to detect at least one source object in a source video including at least one object;
a motion detection unit configured to detect one or more motion of the source object in the source video;
a tube generation unit configured to generate one or more source object tube including the source object on which the motion is detected;
a scene understanding unit configured to determine an interaction associated with the source object of the tube; and
a video synopsis generation unit configured to generate one or more video synopsis based on the source object tube associated with the determined interaction in response to a user query including a synopsis object and a synopsis interaction to be required for synopsis;
wherein the video synopsis generation unit is further configured to:
select the source object associated with the interaction corresponding to the user query as a tube for synopsis, and arranging the selected tubes; and
generate the video synopsis based on the selected tubes and a background.

* * * * *